United States Patent
Aoki et al.

(10) Patent No.: US 8,257,144 B2
(45) Date of Patent: Sep. 4, 2012

(54) NECK PORTION GRINDING APPARATUS AND GRINDING DEVICE EMPLOYED IN THE NECK PORTION GRINDING APPARATUS

(75) Inventors: Wataru Aoki, Nagoya (JP); Hirotsugu Takahama, Toyokawa (JP); Masakazu Nakamura, Toyokawa (JP); Yasuo Hamatake, Toyokawa (JP); Jiro Osawa, Toyokawa (JP); Tamotsu Nagai, Toyokawa (JP)

(73) Assignees: OSG Corporation, Aichi (JP); BTT Corporation, Aichi (JP)

( * ) Notice: Subject to any disclaimer, the term of this patent is extended or adjusted under 35 U.S.C. 154(b) by 1050 days.

(21) Appl. No.: 12/084,944

(22) PCT Filed: Dec. 14, 2005

(86) PCT No.: PCT/JP2005/022976
§ 371 (c)(1),
(2), (4) Date: Aug. 1, 2008

(87) PCT Pub. No.: WO2007/069318
PCT Pub. Date: Jun. 21, 2007

(65) Prior Publication Data
US 2009/0275263 A1 Nov. 5, 2009

(51) Int. Cl.
*B24B 5/04* (2006.01)

(52) U.S. Cl. ............................................. 451/11; 451/49

(58) Field of Classification Search .................. 451/443, 451/444, 72, 49, 11, 5, 242, 246
See application file for complete search history.

(56) References Cited

FOREIGN PATENT DOCUMENTS

| CN | 2238690 Y | 10/1996 |
|---|---|---|
| DE | 517 149 A | 1/1931 |
| DE | 30 09 294 C2 | 9/1981 |
| DE | 693 12 838 T2 | 4/1994 |
| GB | 2 116 085 A | 9/1983 |
| JP | 60-45649 | 3/1985 |
| JP | 58-155170 | 9/1985 |
| JP | 61-105562 | 7/1986 |
| JP | 05-162005 | 6/1993 |
| JP | 11-179628 | 7/1999 |
| JP | 2002-283120 | 10/2002 |
| JP | 2003-145372 | 5/2003 |

*Primary Examiner* — Robert Rose
(74) *Attorney, Agent, or Firm* — Muramatsu & Associates (57) ABSTRACT

A neck portion grinding apparatus and method is designed to reduce working man-hours and to improve processing accuracy with respect to a processing of a workpiece. The neck portion grinding apparatus includes a grinding device having a disc-like grinding wheel and a wheel rotating device for rotating the grinding wheel, and a machine tool having a main shaft for rotatably supporting a rotating tool and a table mounting the grinding device thereon, and relatively moving the main shaft and the table by numeral control. A shape of a neck portion of the rotating tool can be changed by relatively moving the main shaft and the table while mutually rotating the rotating tool and the grinding wheel, and grinding the rotating tool by the grinding wheel.

5 Claims, 5 Drawing Sheets

NECK PORTION GRINDING APPARATUS AND GRINDING DEVICE EMPLOYED IN THE NECK PORTION GRINDING APPARATUS

TECHNICAL FIELD

The present invention relates to neck portion grinding apparatuses, grinding devices employed in the neck portion grinding apparatus, and a neck portion grinding process, in which by grinding a rotating tool, the shape of a neck portion thereof is changed and, particularly, to a neck portion grinding apparatus, a grinding device employed in the neck portion grinding apparatus, and a neck portion grinding method which can reduce working man-hours and improve processing accuracy with respect to a processing of a workpiece.

BACKGROUND ART

A neck portion of a rotating tool (a portion between a holder end and a cutting tooth in a case where the rotating tool is mounted to a machine tool) comprises a shank, and a small diameter section formed smaller in diameter than a shank diameter. The small diameter section is provided in order to avoid interference with a workpiece as described in Japanese Patent Application Laid-open No. 2002-283120.

The rotating tool provided with the small diameter section in this way is increased in an amount of protruding from a processing machine, accordingly, runout of the rotating tool is therefore easy to occur at the time of processing, thus, as long as the interference with the workpiece can be avoided, it is desired that the length of the small diameter section is minimized.

However, a commercially available rotating tool has a small diameter section whose length is set to only predetermined intervals (for example, intervals of 5 mm), so that even if the length of the small diameter section is selected in order to avoid the interference with the workpiece, in some cases, an unnecessary allowance is added to a distance which can avoid the interference between the shank and the workpiece.

Moreover, as compared with a standard product, in which a length of the small diameter section is set to a standard length, there is a slight demand for a special product, in which a length of the small diameter section is set to be longer or shorter than that of the standard product, and the number of stocks thereof is also small, so that the cost thereof is high and it is hard to obtain it.

For this reason, a user of a rotating tool adjusts the length of the small diameter section by grinding the inexpensive standard product or the special product, the length of the small diameter section is short.

DISCLOSURE OF THE INVENTION

Problem to be Solved by the Invention

However, when the length of the small diameter section is adjusted by the user, the rotating tools must be manually ground one by one by means of a grinder, etc., thus there arises a problem that a large number of working man-hours is required.

Further, since the rotating tool is manually ground, processing accuracy at a portion to be ground is deteriorated, thus becoming a factor that causes runout of the rotating tool to occur. Therefore, when the workpiece is processed by using the rotating tool, there is a problem causing a lack of the processing accuracy.

In this regard, in the case of the small diameter rotating tool, the manual working by the grinder, etc. e-f which involves danger, may be handled by a re-grinding worker to adjust the length of the small diameter section. In this case, the deterioration of the processing accuracy of the portion to be ground can be avoided. However, there arises a difference between a rotating shaft at the time of grinding the rotating tool and a rotating shaft at the time of processing the workpiece by using the rotating tool, thereby causing a problem of lack of processing accuracy with respect to processing of the workpiece.

The present invention has been made in order to solve the above-mentioned problems, and it is an object of the present invention to provide a neck portion grinding apparatus, a grinding device employed in the neck portion grinding apparatus, and a neck portion grinding method which can reduce working man-hours and improve processing accuracy with respect to a processing of a workpiece.

Means for Solving the Problem

For achieving the object, in a first aspect of the present invention, a neck portion grinding apparatus comprising: a grinding device having a disc-like grinding wheel and a wheel rotating device for rotating the grinding wheel; and a machine tool having a main shaft for rotatably supporting a rotating tool and a table mounting the grinding device thereon, and relatively moving the main shaft and the table by numeral control, wherein a shape of a neck portion of the rotating tool can be changed by relatively moving the main shaft and the table while mutually rotating the rotating tool and the grinding wheel, and grinding the rotating tool by the grinding wheel.

According to a second aspect of the present invention, in addition to the neck portion grinding apparatus according to the first aspect noted above, the grinding device is adapted to be detachable with respect to the machine tool.

According to a third aspect of the present invention, in addition to the neck portion grinding apparatus according to the first or second aspect noted above, the grinding device is provided with a correction tool adapted to be capable of grinding the grinding wheel, and a correction tool holding device for holding the correction tool in such a manner that the correction tool can approach to or separate from the grinding wheel; and the grinding wheel is corrected by the correction tool by abutting the correction tool on the grinding wheel by the correction tool holding device while rotating the grinding wheel by the wheel rotating device.

According to a fourth aspect of the present invention, in addition to the neck portion grinding apparatus according to the third aspect, the correction tool holding device is provided with a swinging device for swinging the correction tool relative to the grinding wheel; and an outer peripheral portion of the grinding wheel serving as an active face is corrected to a circular arc cross section by the correction tool by abutting the correction tool on the grinding wheel by the correction tool holding device and also swinging the correction tool while rotating the grinding wheel by the wheel rotating device.

According to a fifth aspect of the present invention, in addition to the neck portion grinding apparatus according to any of the first to fourth aspects noted above, the grinding wheel is provided with a rounded section positioned around an outer peripheral portion serving as an active face and formed into a circular arc cross section; and the rotating tool is ground by a portion of the grinding wheel including at least the rounded section.

A sixth aspect of the present invention is directed to the grinding device used for the neck portion grinding apparatus according to any of the first to fifth aspects noted above.

A seventh aspect of the present invention is directed to a neck portion grinding method for changing a shape of a neck portion of the rotating tool by grinding the rotating tool by the grinding wheel by the use of: a grinding device having a disc-like grinding wheel and a wheel rotating device for rotating the grinding wheel; and a machine tool having a main shaft for rotatably supporting a rotating tool and a table mounting the grinding device thereon, and relatively moving the main shaft and the table by numerical control, the neck portion grinding method comprising: a first step of abutting the grinding wheel on the rotating tool by relatively moving the main shaft and the table; and a second step of grinding the rotating tool by relatively moving the main shaft and the table while mutually rotating the rotating tool and the grinding wheel, in a condition where the grinding wheel abuts on the rotating tool in the first step.

Effect of the Invention

The neck portion grinding apparatus in the first aspect of the present invention has a grinding device including a disc-like grinding wheel and a wheel rotating device for rotating the grinding wheel, and a machine tool including a main shaft for rotatably supporting a rotating tool, and a table mounting the grinding device thereon. The machine tool is adapted to make relative motion of the main shaft and the table by numerical control. Thus, the apparatus is capable of changing a shape of a neck portion of the rotating tool by relatively moving the main shaft and the table while mutually rotating the rotating tool and the grinding wheel, and grinding the rotating tool by the grinding wheel.

Moreover, since the rotating tool is ground by relatively moving the main shaft (rotating tool) and the table (grinding device), the work time is shortened as compared to the case where the rotating tools are manually ground one by one by the grinder, etc. as in the past, and according to this, it is capable of reducing working man-hours.

Moreover, since the rotating tool is ground by relatively moving the main shaft (rotating tool) and the table (grinding device), it can improve processing accuracy with respect to processing of a workpiece by restricting runout of the rotating tool.

Moreover, since the rotating tool held by the main shaft is ground by the grinding wheel, the rotating tool is ground on the machine tool. Thereby, a rotating shaft at the time of grinding the rotating tool and a rotating shaft at the time of processing the workpiece by using the rotating tool can be the same, which can improve the processing accuracy with respect to the processing of the workpiece by restricting the runout of the rotating tool. As a result, processing requirements for processing the workpiece (for example, feed speed and depth of cut) can be improved and the processing performance of the rotating tool can be improved.

Further, since it is possible to grind the rotating tool on the machine tool, a plurality of rotating tools required for processing objects to be machined are ground in advance and the rotating tools are prepared for every holders, whereby simplifying the work.

According to a neck portion grinding apparatus in the second aspect of the present invention, in addition to the effect exerted by the neck portion grinding apparatus in the first aspect noted above, since the grinding device is adapted to be detachable with respect to the machine tool, a work space can be secured on the table of the machine tool by removing the grinding device. Therefore, the workpiece is fixed while being held in the secured work space by a chuck, etc. and can be processed, so that the machine tool can be used as a cutting-processing machine.

According to a neck portion grinding apparatus in the third aspect of the present invention, in addition to the effect exerted by the neck portion grinding apparatus in the second aspect noted above, since the grinding device is provided with a correction tool holding device for holding a correction tool in such a manner that the correction tool is approachable and separable relative to the grinding wheel, it is capable of correcting the grinding wheel by the correction tool by abutting the correction tool on the grinding wheel by the correction tool holding device while rotating the grinding wheel by the wheel rotating device. Thereby, the grinding wheel is corrected while it is left attached to the grinding device, so that the runout of the grinding wheel is restricted as compared to a case where it is impossible to correct the grinding wheel unless it is removed.

According to a neck portion grinding apparatus in the fourth aspect of the present invention, in addition to the effect exerted by the neck portion grinding apparatus in the third aspect noted above, since the correction tool holding device is provided with a swinging device for swinging the correction tool relative to the grinding wheel, an outer peripheral portion of the grinding wheel serving as an active face can be corrected to a circular arc cross section by the correcting tool by abutting the correction tool on the grinding wheel by the correction tool holding device and swinging the correction tool while rotating the grinding wheel by the wheel rotating device. Thereby, the grinding wheel is ground while it is left attached to the grinding device, so that the runout of the grinding wheel is restricted as compared to the case where it is impossible to correct the grinding wheel unless it is removed.

According to a neck portion grinding apparatus in the fifth aspect of the present invention, in addition to the effect exerted by the neck portion grinding apparatus in any of the first to fourth aspects noted above, since the grinding wheel is provided with a rounded section positioned around an outer peripheral portion serving as an active face and formed into a circular arc cross section, it is capable of grinding the rotating tool by a portion of the grinding wheel including at least the rounded section. Thereby, the shape of the portion to be ground of the rotating tool can be formed into a circular arc-shape corresponding to the rounded section so that rigidity of the rotating tool can be increased. Moreover, it is possible to restrict a load applied to the grinding wheel at the time of grinding the rotating tool, so that durability of the grinding wheel can be improved.

According to a grinding device in the sixth aspect of the present invention, the same effects as exerted by the grinding device employed in the neck portion grinding apparatus in any of the first to fifth aspects noted above can be achieved.

According to a neck portion grinding process in the seventh aspect of the present invention, a grinding device including a disc-like grinding wheel and a wheel rotating device for rotating the grinding wheel, and a machine tool including a main shaft for rotatably supporting a rotating tool, and a table for mounting the grinding device thereon, the machine tool being adapted to make relative motion of the main shaft and the table by numerical control, are employed and the neck portion grinding process comprises a first step of abutting the grinding wheel on the rotating tool by relatively moving the main shaft and the table, and a second step of grinding the rotating tool by relatively moving the main shaft and the table while mutually rotating the rotating tool and the grinding wheel, in a condition where the grinding wheel abuts on the rotating tool in the first step, so that the main shaft and the table can be relatively moved while mutually rotating the rotating tool and the grinding wheel. Therefore, by grinding the rotating tool by the grinding wheel, it is capable of changing a shape of a neck portion of the rotating tool.

Moreover, the abutment of the rotating tool and the grinding wheel is made in the first step and, in the second step, the rotating tool is ground by relatively moving the main shaft and the table while mutually rotating the rotating tool and the grinding wheel, thus the work time is shortened as compared to the case where rotating tools are manually ground one by one by the grinder, etc. as in the past, and according to this, it is capable of reducing reworking man-hours.

Moreover, since the abutment of the rotating tool and the grinding wheel is made in the first step and, in the second step, the rotating tool is ground by relatively moving the main shaft and the table while mutually rotating the rotating tool and the grinding wheel, it can improve the processing accuracy with respect to processing of a workpiece by restricting the runout of the rotating tool.

Moreover, the abutment of the rotating tool and the grinding wheel is made in the first step and, in the second step, the rotating tool is ground by relatively moving the main shaft and the table while mutually rotating the rotating tool and the grinding wheel, thus it is capable of restricting deflection of the rotating tool as compared to a case where the grinding wheel is pushed in a direction perpendicular to an axis of the rotating tool and the grinding is performed. As a result, the processing accuracy with respect to the workpiece can be improved.

BRIEF DESCRIPTION OF THE DRAWINGS

FIG. 2 (a) is a top plan view of a grinding device and FIG. 2 (b) is a sectional view of the grinding device taken along line IIb-IIb in FIG. 2(a).

FIG. 3 (a) is a front view of the grinding device viewed from an arrow 111a direction in FIG. 2(a)

FIGS. 5(a)-5(c) are views each showing chronologically a situation where the shape of the neck portion of a rotating tool is changed, and FIGS. 5(a), 5(b) and 5(c) are pattern diagrams showing a first step, a second step, and a third step, respectively.

EXPLANATION OF REFERENCE NUMERALS AND SYMBOLS

1 Neck portion grinding apparatus
10 Machine tool
12 Table
15 Main shaft
20 Grinding device
30 Wheel rotating device
40 Correction tool holding device
43 Swinging device
R Correction tool
T Rotating tool
W Grinding wheel
Wa Rounded section

BEST MODE FOR CARRYING OUT THE INVENTION

Figure 1:
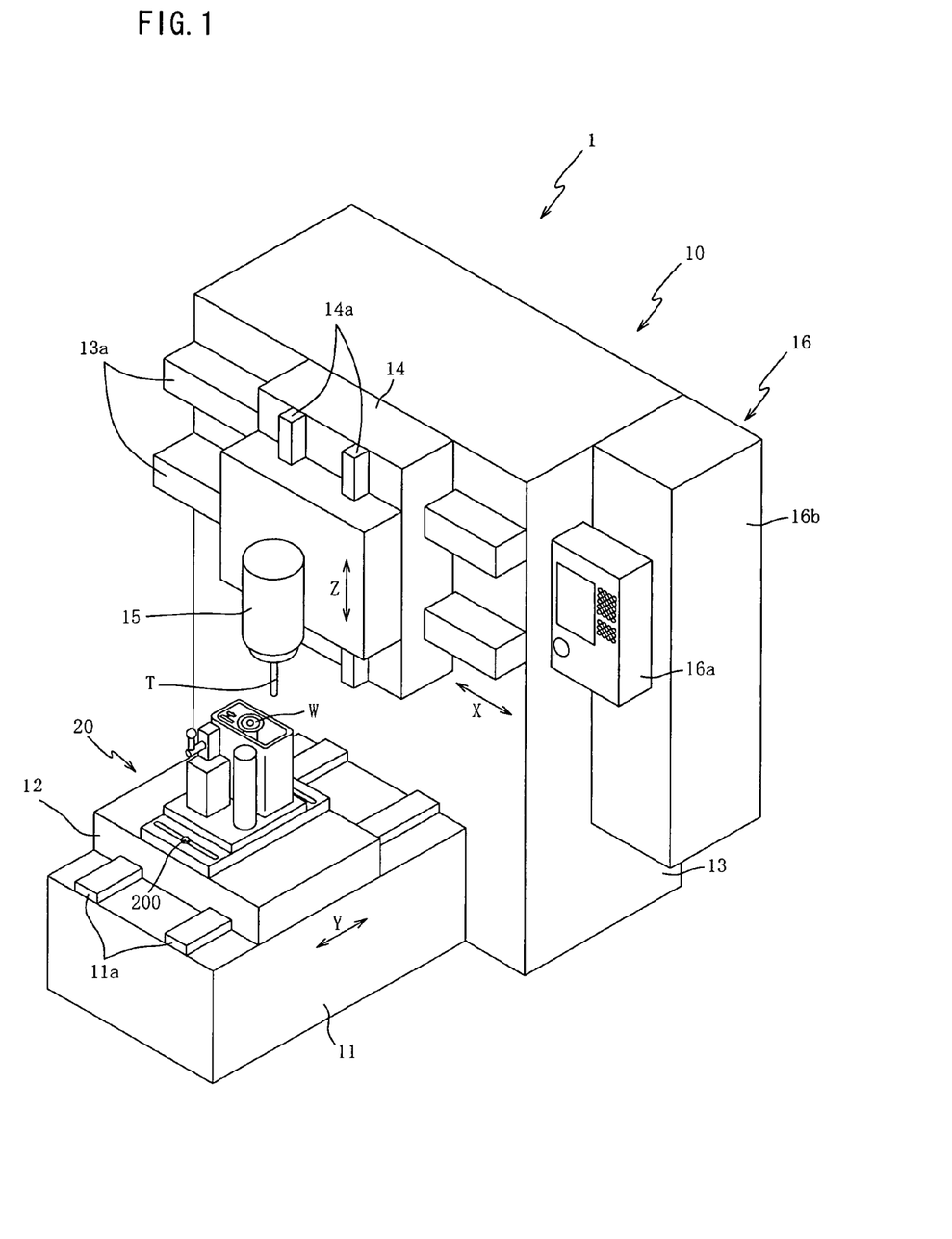
FIG. 1 is a perspective view of a neck portion grinding apparatus according to one embodiment of the present invention.

A preferred embodiment of the present invention will be explained hereinafter with reference to the accompanying drawings. FIG. 1 is a perspective view of a neck portion grinding apparatus 1 according to one embodiment of the present invention.

First, referring to FIG. 1, a summary of the construction of the neck portion grinding apparatus 1 will be explained. As shown in FIG. 1, the neck portion grinding apparatus 1 mainly includes a machine tool 10 and a grinding device 20. The neck portion grinding apparatus 1 is an apparatus for changing the shape of the neck portion of a rotating tool T by grinding the rotating tool T by a grinding wheel W of the grinding device 20.

Figure 5A:
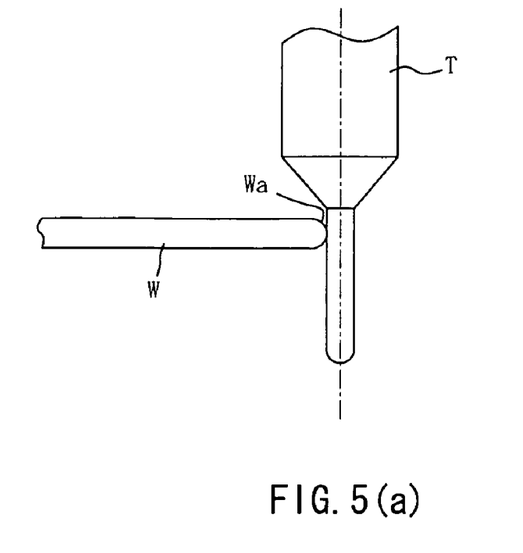
Figure 5B:
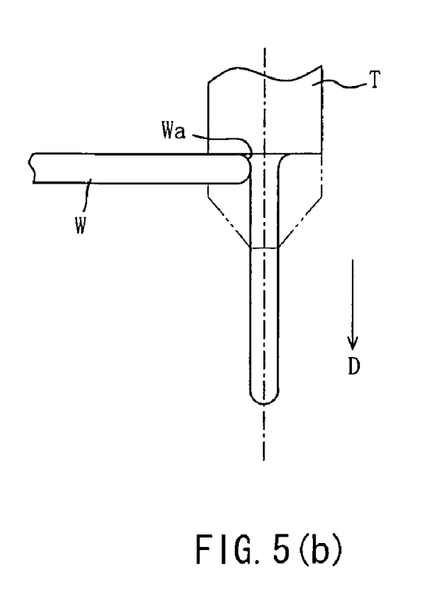
Figure 5C:
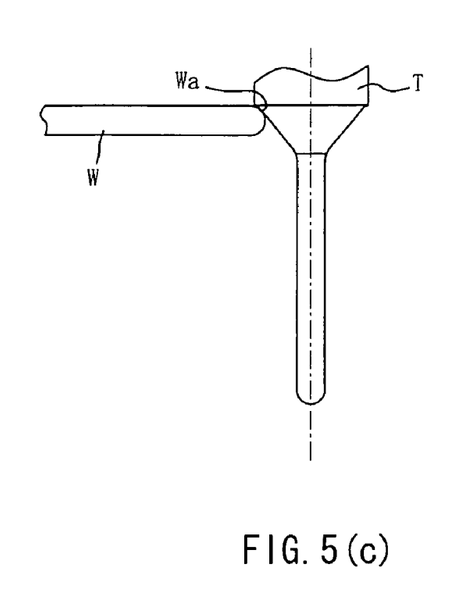

More specifically, the shape of the neck portion of the rotating tool T is changed by abutting the grinding wheel W on the rotating tool T and thereby grinding the rotating tool T (refer to FIG. 5).

Next, the detailed constructions of respective sections will be explained. As shown in FIG. 1, the machine tool 10 mainly includes a bed 11 serving as a base, a table 12 supported on the bed 11, a column 13 erected behind the bed 11, a main shaft head 14 supported on the column 13, a main shaft 15 supported on the main shaft head 14, and an NC device 16 for numerically controlling relative motion of the table 12 and the main shaft 15. The machine tool 10 is a device for numerically controlling the relative motion of the table 12 and the main shaft 15 by the NC device 16.

The table 12 is a member for mounting the grinding device 20 thereon which will be described hereinafter, and as shown in FIG. 1, it is fitted to table guide rails 11a formed on the bed 11. The table 12 is moved in a Y-direction (an arrow Y direction in FIG. 1) along the table guide rails 11a by means of a table moving device (not shown) provided on the bed 11.

The main shaft head 14 is a member for supporting the main shaft 15, and as shown in FIG. 1, it is fitted to main shaft head guide rails 13a formed on the column 13. The main shaft head 14 is moved in an X-direction (an arrow X direction in FIG. 1) along the main shaft head guide rails 13a by means of a main shaft head moving device (not shown) provided on the column 13.

The main shaft 15 is a member rotatably supporting the rotating tool T, and as shown in FIG. 1, it is fitted to main shaft guide rails 14a formed on the main shaft head 14. The main shaft 15 is moved in a Z-direction (an arrow Z direction in FIG. 1) along the main shaft guide rails 14a by means of a main shaft moving device (not shown) provided on the main shaft head 14, and also applies a rotational drive force of a main shaft motor (not shown) to the rotating tool T to rotate the rotating tool T around an axis.

Incidentally, in this embodiment, the respective moving devices include electric motors for generating rotational drive forces, and ball screws for converting rotational motion of the electric motors into linear motion to transmit it to the table 12, the main shaft head 14 or the main shaft 15 none of them shown).

The NC device 16 is a device for numerically controlling the relative motion of the table 12 and the main shaft 15 constructed as described above and controlling the rotational drive of the rotating tool T (direction of rotation and rotation speed). As shown in FIG. 1, the NC device 16 mainly includes an operation panel 16a through which a worker inputs processing requirements (for example, numerical information indicating a relative position of the table 12 and the main shaft 15), and a control device 16b for controlling the relative motion of the table 12 and the main shaft 15 and the rotation of the rotating tool T, on the basis of the processing requirements inputted via the operation panel 16a.

In the case where the processing requirements are inputted into the operation panel 16a by the worker, the control device 16b drive-controls the electric motors of the respective moving devices on the basis of the processing requirements to control the relative motion of the table 12 and the main shaft 15, and also drive-controls the main shaft motor to control the rotation of the rotating tool T.

Figure 2A:
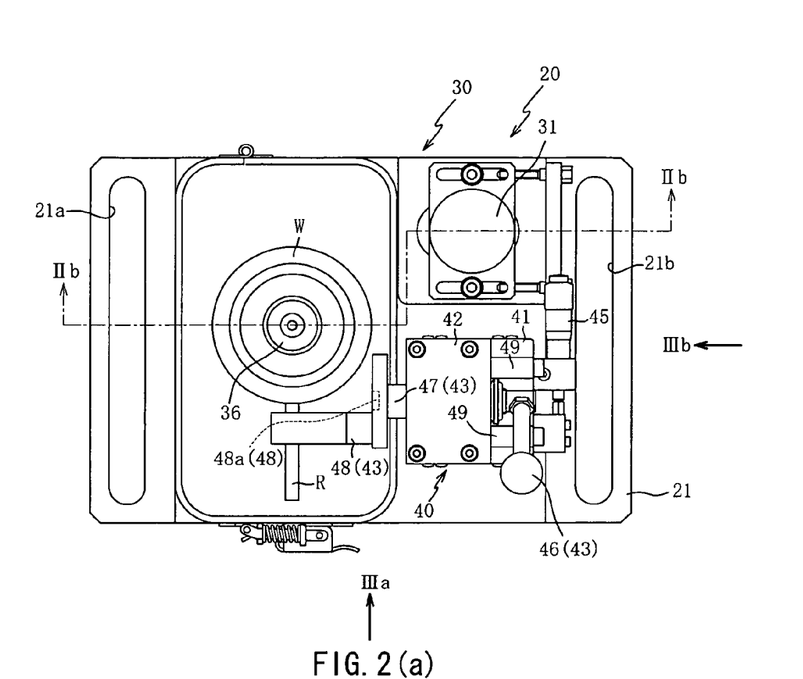
Figure 2B:
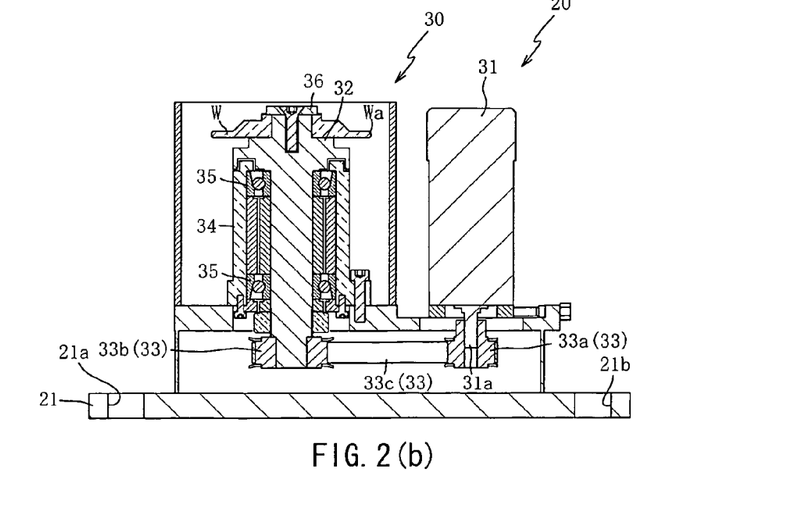
Figure 3A:
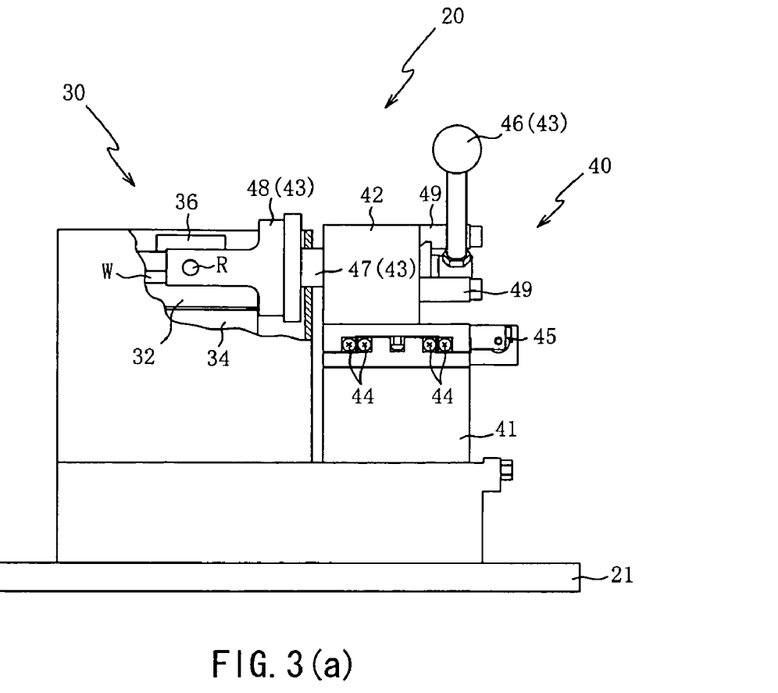

Next, referring to FIGS. 2 and 3, the grinding device 20 will be explained. FIG. 2(a) is a top plan view of the grinding device 20 and FIG. 2(b) is a sectional view of the grinding device 20 along line IIb-IIb in FIG. 2(a). Moreover, FIG. 3(a) is a front view of the grinding device viewed from an arrow IIIa direction in FIG. 2(a), and FIG. 3(b) is a side view of the grinding device 20 viewed from an arrow IIIb direction in FIG. 2(a). Incidentally, in FIG. 3(a), a part of the grinding device 20 is sectionally viewed.

Figure 3B:
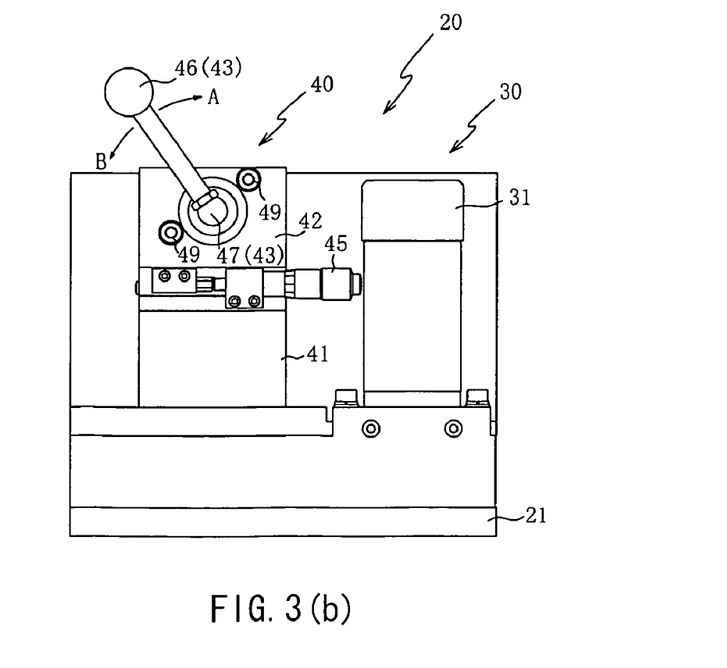
FIG. 3(b) is a side view of the grinding device viewed from an arrow 111b direction in FIG. 2(a).

The grinding device 20 is a device for grinding the rotating tool T by the grinding wheel W and, as shown in FIGS. 2 and 3, mainly includes a base 21 serving as a foundation, a wheel rotating device 30 provided on the base 21 and also holding the grinding wheel W, and a correction tool holding device 40 holding a correction tool R for correcting (truing) the grinding wheel W.

The base 21 is a member fixed on the table 12 of the machine tool 10 and, as shown in FIGS. 2 and 3, it is formed into a substantially rectangular-shape from metallic material. Moreover, this base 21 is provided with elliptic holes 21a, 21b passing through two sides thereof as shown in FIG. 2. The base 21 is fixed on the table 12 of the machine tool 10 by bolts 200 (refer to FIG. 1) inserted into the holes 21a, 21b.

The grinding device 20 is constructed detachably with respect to the machine tool 10, so that a work space can be secured on the table 12 of the machine tool 10 by removing the grinding device 20. Therefore, a workpiece is fixed while being held in the secured work space by a chuck, etc. and the workpiece can be processed, so that the machine tool 10 can be utilized as a cutting-processing machine. On the other hand, when an enough work space is secured on the table 12 of the machine tool 10, the workpiece may be processed in a condition where the grinding device 20 is left fixed on the table 12. In this case, it is not necessary to determine the position information every time when the grinding device 20 is used, so that the work can be simplified.

The wheel rotating device 30 is a device for rotating the grinding wheel W and, as shown in FIG. 2, mainly includes a drive motor 31 for generating rotational drive force, a wheel holding shaft 32 provided adjacent to the drive motor 31, and a transmission device 33 for transmitting the rotational drive force of the drive motor 31 to the wheel holding shaft 32.

The grinding wheel W is a grinding tool made of diamond abrasive grains and formed into a substantially disc-like shape as shown in FIG. 2. Incidentally, this grinding wheel W is made of the diamond abrasive grains only in its outer peripheral portion serving as an active face. Further, the grinding wheel W is provided with a rounded section Wa positioned around the outer peripheral portion serving as the active face and formed into a circular arc cross section.

The drive motor 31 is an electric motor using electrical power as a drive source and, as shown in FIG. 2(b), connected at a drive shaft 31a thereof to the transmission device 33. The wheel holding shaft 32 is a member for holding the grinding wheel W and, as shown in FIG. 2(b), mounted at one end thereof on the transmission device 33 and supported by a frame body 34 via bearing 35. Moreover, on the wheel holding shaft 32, a cover member 36 for fixing the grinding wheel W is provided.

The transmission device 33 is a device for connecting the drive shaft 31a of the drive motor 31 and the wheel holding shaft 32 and, as shown in FIG. 2(b), mainly includes a first pulley 33a mounted on the drive shaft 31a of the drive motor 31, a second pulley 33b mounted on the wheel holding shaft 32, and a belt 33c for connecting the first pulley 33a and the second pulley 33b.

When the drive motor 31 is rotated, the first pulley 33a mounted to the drive shaft 31a of the drive motor 31 is rotated and the rotation of the first pulley 33a is transmitted to the second pulley 33b via the belt 33c. Since the second pulley 33b is rotated, consequently, the wheel holding shaft 32 is rotated.

The correction tool holding device 40 is a device for causing the correction tool R to approach to or separate from the grinding wheel W and, as shown in FIGS. 2 and 3, mainly includes a support base 41 serving as a foundation, a moving base 42 supported on the support base 41, and a swinging device 43 supported on the moving base 42.

The correction tool R is a grinding tool made from diamond abrasive grains and, as shown in FIGS. 2 and 3, formed into a substantially shaft-like body.

The moving base 42 is a member that slides relative to the support base 41 and, as shown in FIG. 3(a), provided with guides 44 arranged on an abutment surface on the support base 41.

The guides 44 are members for restricting a direction of the sliding of the moving base 42 relative to the support base 41 and, as shown in FIG. 3(a), extended in such a direction that the correction tool R approaches to or separates from the grinding wheel W (a direction perpendicular to a sheet of FIG. 3(a)). Thereby, when the moving base 42 is slid relative to the support base 41, the moving base is limited in only the direction that the correction tool R approaches to or separates from the grinding wheel W.

Moreover, as shown in FIGS. 2 and 3, the moving base 42 is provided with a micrometer 45 for moving the moving base 42 while measuring a sliding amount. When the micrometer 45 is turned, the moving base 42 is slid relative to the support base 41 in proportion to the turning amount and the correction tool R can be moved away from or abut on the grinding wheel W according to the turning direction.

The swinging device 43 is a device for swinging the correction tool R relative to the grinding wheel W and, as shown in FIGS. 2 and 3, mainly includes a lever 46, a rotating shaft 47 connected to the lever 46, and a swinging member 48 connected to the rotating shaft 47.

The lever 46 is a member rotating the rotating shaft 47 around an axis and, as shown in FIG. 3(b), adapted to be rotatable in an arrow A direction (clockwise in FIG. 3(b)) and in an arrow B direction (counterclockwise in FIG. 3(b)). Incidentally, the rotation range of the lever 46 is limited to a predetermined amount by stoppers 49 provided on the moving base 42.

The rotating shaft 47 is a member swinging the swinging member 48 according to the rotation of the lever 46 and, as shown in FIGS. 2 and 3, inserted into the moving base 42.

The swinging member 48 is a member for holding the correction tool R and, as shown in FIGS. 2 and 3, formed into a substantially L-shape as viewed from the top, in such a manner that the correction tool R is swung around the axis of the rotating shaft 47. When the rotating shaft 47 is rotated by the lever 46, the correction tool R is swung by a distance spaced apart from the axis of the rotating shaft 47. Incidentally, the center of the swinging of the correction tool R, that is, the axis of the rotating shaft 47 matches with the height of a center line in a thickness direction in the active face of the grinding wheel W made of the diamond abrasive grains.

Moreover, as shown in FIG. 2(a), the swinging member 48 is provided with a substantially cylindrical recessed portion 48a that has the same axis as the axis of the rotating shaft 47. When a radius of the swinging of the correction tool R relative to the axis of the rotating shaft 47 is set, the setting is carried out by using a cylindrical shaft body (not shown) having a protruding portion fitted to the recess portion 48a. More specifically, a plurality of shaft bodies different in radius are prepared and, when the radius of the swinging of the correction tool R relative to the axis of the rotating shaft 47 is desired to be set to 3 mm, for example, a shaft body with a radius of 3 mm is fitted into the recess portion 48a and the correction tool R is held by the swinging member 48 to abut on the shaft body. Thereby, the correction tool R is supported spacedly by 3 mm relative to the axis of the rotating shaft 47, so that the radius of the swinging of the correction tool R relative to the axis of the rotating shaft 47 is set to 3 mm.

Figure 4A:
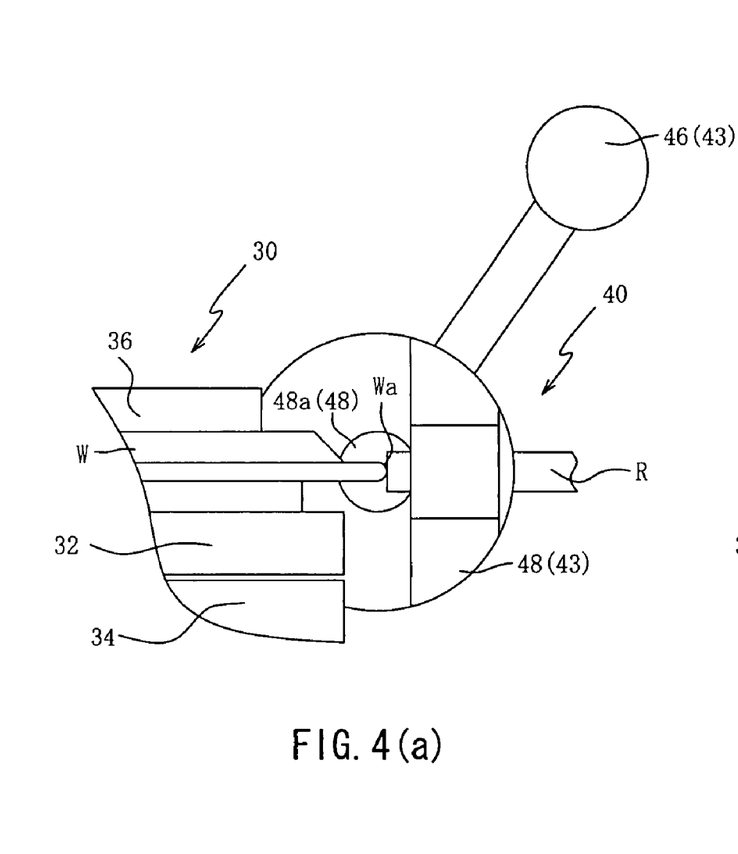
FIG. 4(a) is a partially enlarged view of the grinding device showing a condition where a correction tool perpendicularly abuts on a grinding wheel.
Figure 4B:
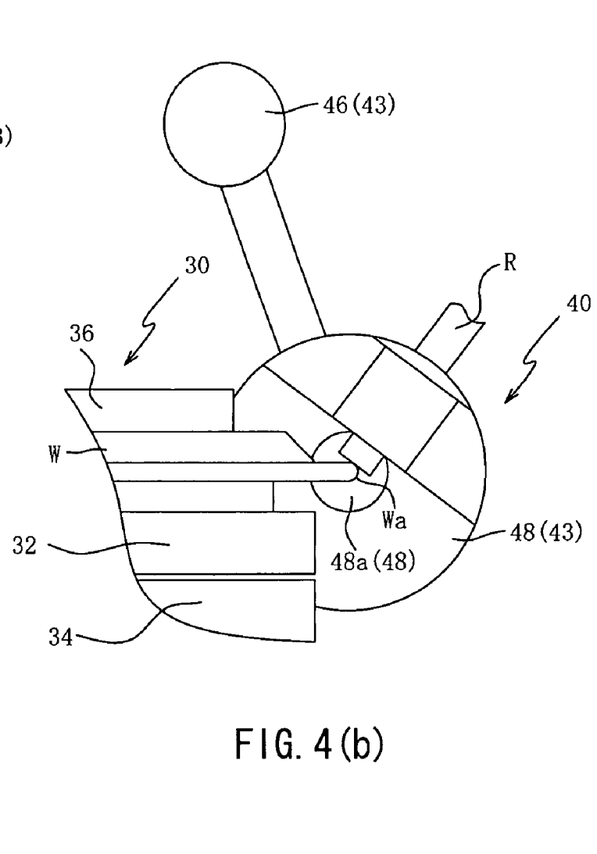
FIG. 4(b) is a partially enlarged view of the grinding device showing a condition where the correction tool is swung.

Referring now to FIG. 4, a process for correcting the grinding wheel W by the correction tool R will be explained. FIG. 4(a) and FIG. 4(b) are partially enlarged views of the grinding device 20 showing a condition where the correction tool R perpendicularly abuts on the grinding wheel W, and a condition where the correction tool R is swung, respectively. Incidentally, in FIG. 4, a part of the grinding device 20 is omitted from drawings.

In the case where the grinding wheel W is corrected by the correction tool R, firstly, as shown in FIG. 4(a), the correction tool R perpendicularly abuts on the grinding wheel W. Incidentally, in this embodiment, the moving base 42 is moved relative to the support base 41 by the micrometer 45, thereby perpendicularly abutting the correction tool R on the grinding wheel W. In this case, the moving base 42 is slid in proportion to the turning amount of the micrometer 45, so that the grinding wheel W can be corrected by the correction tool R while setting to a predetermined correction amount.

Next, as shown in FIG. 4(b), the lever 46 is swung in an arrow A direction in FIG. 3(b) and the correction tool R is swung relative to the grinding wheel W. Incidentally, in this embodiment, the swinging member 48 is swung by the lever 46, thereby the correction tool R is moved relative to the support base 41 swinging the correction tool R relative to the grinding wheel W.

Since the grinding device 20 is provided with the correction tool holding device 40 holding the correction tool R in such a manner that it can approach to or leave from the grinding wheel W, the grinding wheel W is corrected by the correction tool R by abutting the correction tool R on the grinding wheel W by the correction tool holding device 40 while rotating the grinding wheel W by the wheel rotating device 30. Thereby, the grinding wheel W can be corrected while it is attached to the grinding device 20, so that runout of the grinding wheel W is restricted, as compared to a case where it is impossible to make the correction unless the grinding wheel W is removed.

Moreover, since the correction tool holding device 40 is provided with the swinging device 43 for swinging the correction tool R relative to the grinding wheel W, the outer peripheral portion of the grinding wheel W serving as the active face can be corrected into a circular arc cross section by the correction tool R by abutting the correction tool R on the grinding wheel W by the correction tool holding device 40 and swinging the correction tool R, while rotating the grinding wheel W by the wheel rotating device 30. Thereby, the grinding wheel W can be corrected while it is attached to the grinding device 20, so that the runout of the grinding wheel W is restricted, as compared to the case where it is impossible to make the correction unless the grinding wheel W is removed.

As explained above, the neck portion grinding apparatus 1 is provided with the grinding device 20 that includes the disc-like grinding wheel W and the wheel rotating device 30 for rotating the grinding wheel W, and the machine tool 10 that includes the main shaft 15 rotatably supporting the rotating tool T and the table 12 mounting the grinding device 20 thereon and performs the relative motion of the main shaft 15 and the table 12 by the numerical control, so that the main shaft 15 and the table 12 can be relatively moved while mutually rotating the rotating tool T and the grinding wheel W. Thereby, by grinding the rotating tool T by the grinding wheel W, the shape of the neck portion of the rotating tool T can be changed.

Moreover, since the rotating tool T can be ground by relatively moving the main shaft 15 (rotating tool T) and the table 12 (grinding device 20), the work time is shortened as compared to a case where rotating tools are manually ground one by one by the grinder, etc. as in the past, and according to this, working man-hours can be reduced.

Moreover, since the rotating tool T can be ground by relatively moving the main shaft 15 (rotating tool T) and the table 12 (grinding device 20), the runout of the rotating tool T is restricted and processing accuracy with respect to the processing of the workpiece can be improved.

Moreover, since the rotating tool T held on the main shaft 15 is ground by the grinding wheel W, the rotating tool T can be ground on the machine tool 10. Since the rotating shaft at the time of grinding the rotating tool T and the rotating shaft at the time of processing the workpiece by using the rotating tool T can be the same, the runout of the rotating tool T is restricted and the processing accuracy with respect to the processing of the workpiece can be improved. As a result, processing requirements for processing the workpiece (for example, feed speed and depth of cut) can be improved and processing performance of the rotating tool T can be improved.

Moreover, since the rotating tool T can be ground on the machine tool 10, a plurality of rotating tools T required for processing workpiece are ground in advance and the rotating tools T are prepared for every holders, whereby the work can be simplified.

Next, referring to FIGS. 5(a)-5(c), an explanation will be given for a neck portion grinding process extending a length of the neck portion of the rotating tool T by grinding the rotating tool T by the grinding wheel W by using the machine tool 10 and the grinding device 20 as described above. FIGS. 5(a)-5(c) are views each showing chronologically a situation where the shape of the neck portion of the rotating tool T is changed, where FIGS. 5(a), 5(b) and 5(c) are pattern diagrams of the grinding wheel W and the rotating tool T, showing a first step, a second step, and a third step, respectively. Incidentally, in FIG. 5, portions of the grinding wheel W and the rotating tool T are omitted and also a shape of a cutting tooth of the rotating tool T is omitted.

In the case where the shape of the neck portion of the rotating tool T is changed by grinding the rotating tool T by the grinding wheel W, first, as shown in FIG. 5(a), the grinding wheel W is moved in an arrow C direction, and the grinding wheel W abuts on the rotating tool T (first step). Incidentally, in this embodiment, the main shaft 15 is lowered in advance in the Z-direction by the NC device 16 in such a manner that the position of the rotating tool T matches with the height of the grinding wheel W and, thereafter, the table 12 is moved in the Y-direction by the NC device 16 so that the grinding wheel W is moved in the arrow C direction.

Next, as shown in FIG. 5(*b*), the rotating tool T is moved in an arrow D direction, that is, the rotating tool T is moved parallel to the axis of the rotating tool T, and the rotating tool T is ground by the grinding wheel W, thereby changing the shape of the neck portion of the rotating tool T (second step) Incidentally, in this embodiment, the main shaft 15 is moved in the Z-direction by the NC device 16 in such a manner that the rotating tool T is moved in the arrow D direction. Incidentally, in the second step, the rotating tool T is moved in the arrow D direction while rotating the rotating tool T and the grinding wheel W in opposite directions to each other (means a case where when viewed in the axial direction of the rotating tool T, if the rotation direction of the rotating tool T is, for example, clockwise, the rotation direction of the grinding wheel W is also clockwise).

However, the rotation directions of the rotating tool T and the grinding wheel W are not limited to the opposite directions to each other and the rotating tool T and the grinding wheel W may be rotated in the same direction. In this case, deflection of the rotating tool T can be restricted. As a result, the runout of the rotating tool T is restricted and the processing accuracy with respect to the processing of the workpiece can be improved.

Next, as shown in FIG. 5(*c*), the grinding wheel W and the rotating tool T are relatively moved and the rotating tool T is ground by the grinding wheel W, thereby forming a conical connection portion between the neck portion and a shank (third step). By this connection portion, rigidity of the rotating tool T can be increased by avoiding the interference with the workpiece. Incidentally, in this embodiment, the table 12 and the main shaft 15 are moved in the Y-direction and in the Z-direction by the NC device 16, respectively, in such a manner that the grinding wheel W and the rotating tool T are relatively moved.

Since the above-mentioned neck portion grinding process employs the first step of abutting the grinding wheel W on the rotating tool T by relatively moving the main shaft 15 and the table 12 by using the grinding device 20 and the machine tool 10, and the second step of grinding the rotating tool T by relatively moving the main shaft 15 and the table 12 while mutually rotating the rotating tool T and the grinding wheel W, in the condition where the grinding wheel W abuts on the rotating tool T in the first step, the main shaft 15 and the table 12 can be relatively moved while mutually rotating the rotating tool T and the grinding wheel W. Thus, by grinding the rotating tool T by the grinding wheel W, the shape of the neck portion of the rotating tool T can be changed.

Moreover, since the grinding wheel W abuts on the rotating tool T in the first step, and, in the second step, the rotating tool T is ground by relatively moving the main shaft 15 and the table 12 while mutually rotating the rotating tool T and the grinding wheel W, the work time is shortened as compared to the case where the rotating tools are manually ground one by one by the grinder, etc. as in the past, and according to this, the working man-hours can be reduced.

Moreover, since the grinding wheel W abuts on the rotating tool T in the first step and, in the second step, the rotating tool T is ground by relatively moving the main shaft 15 and the table 12 while mutually rotating the rotating tool T and the grinding wheel W, the runout of the rotating tool T is restricted and the processing accuracy with respect to the processing of the workpiece can be improved.

Moreover, since the grinding wheel W abuts on the rotating tool T in the first step and, in the second step, the rotating tool T is ground by relatively moving the main shaft 15 and the table 12 while mutually rotating the rotating tool T and the grinding wheel W, the deflection of the rotating tool T is restricted as compared to a case where the grinding wheel W is pushed in the direction perpendicular to the axis of the rotating tool T and the grinding is performed. As a result, the processing accuracy with respect to the processing of the workpiece is improved.

Moreover, since the grinding wheel W is provided with the rounded section Wa, the rotating tool can be ground by a portion of the grinding wheel W including at least the rounded section Wa. Thereby, the shape of the ground portion of the rotating tool T can be formed into a circular arc-shape corresponding to the rounded section Wa, thereby increasing the rigidity of the rotating tool T. Moreover, since a load applied to the grinding wheel W at the time of grinding the rotating tool T is restricted, durability of the grinding wheel W can be improved.

Although the present invention has been explained above on the basis of the embodiments, the present invention is not limited to the embodiments, and it can be easily surmised that the present invention can be modified in a variety of ways without departing from the spirit and scope of the present invention.

Although, for example, in the embodiment descried above, the case has been explained, where the table 12 of the machine tool 10 is configured to be movable in the Y-direction and the main shaft 15 is configured to be movable in the X-direction and in the Z-direction, the moving directions of the table 12 and the main shaft 15 are not necessarily limited thereto. For example, the table 12 may be configured to be movable in the X-direction and the main shaft 15 may be configured to be movable in Y-direction. That is, as long as the table and the main shaft 15 are so formed that they are relatively moved, the moving directions of the table 12 and the main shaft 15 and a combination of the moving directions are not limited to the above embodiment.

Moreover, in the above embodiment, although the case has been explained, where, in the first step, the grinding wheel W abuts on the rotating tool T by moving the table 12 of the machine tool 10 (grinding device 20) in the Y-direction, the relative motion of the grinding wheel W and the rotating tool T is not necessarily limited to this and, for example, the rotating tool T may abut on the grinding wheel W by moving the main shaft 15 of the machine tool 10 (rotating tool T) in the X-direction. That is, as long as the rotating tool T abuts on the grinding wheel W, the relative motion of the grinding wheel W and the rotating tool T is not limited to the above embodiment.

Moreover, in the above embodiment, although the case has been explained, where, in the second step, the rotating tool T is ground by moving the main shaft 15 of the machine tool 10 (rotating tool T) in the Z-direction, the relative motion of the grinding wheel W and the rotating tool T is not necessarily limited to this and, for example, the table 12 of the machine tool 10 may be configured to be movable in the Z-direction, and the table 12 of the machine tool 10 (grinding device 20) may be moved in the Z-direction, thereby grinding the rotating tool T. That is, as long as the rotating tool T is ground, the relative motion of the grinding wheel W and the rotating tool T is not limited to the above embodiment.

Moreover, in the above embodiment, although the case has been explained, where, in the second step, the rotating tool T is moved parallel to the axis, the relative motion of the grinding wheel W and the rotating tool T is not necessarily limited to this and, for example, the rotating tool T may be moved while inclining the rotating tool T relative to the axis to form the processed shape of the ground portion into a tapered shape, or the rotating tool T may be moved to describe a parabola relative to the axis for forming the processed shape of the ground portion into a curved shape.

Thereby, since the rotating tool T is formed to have an optimum shape with respect to the workpiece, unnecessary grinding of the rotating tool T is avoided and the rigidity of the rotating tool T can be enhanced. As a result, the processing requirements that are required for processing the workpiece (for example, feed speed and depth of cut) can be improved and the processing performance of the rotating tool T can be improved.

Moreover, in the above embodiment, although the case has been explained, where, in the third step, the rotating tool T is moved while inclining the rotating tool T relative to the axis to form the processed shape of the ground portion into a tapered shape, the relative motion of the grinding wheel W and the rotating tool T is not necessarily limited to this and, for example, the rotating tool T may be moved to describe the parabola relative to the axis or the rotating tool T may be separated away from the grinding wheel W, in such a manner that the processed shape of the ground portion is formed into a curved shape.

Thereby, since the rotating tool T can be formed to have the optimum shape with respect to the workpiece, the unnecessary grinding of the rotating tool T is avoided and the rigidity of the rotating tool T can be enhanced. As a result, the processing requirements that are required for processing the workpiece (for example, feed speed and depth of cut) can be improved and the processing performance of the rotating tool T can be improved.

Moreover, in respective embodiments, although the case has been explained, where the drive motor 31 of the wheel rotating device 30 and the wheel holding shaft 32 are designed to be connected to each other by the transmission device 33, the construction of the wheel rotating device 30 is not necessarily limited to this, and the drive shaft 31a of the drive motor 31 and the wheel holding shaft 32 may be designed to be integrally formed.

In this case, since the transmission device 33 becomes unnecessary, it is possible to reduce the cost of the parts according to this. As a result, it is possible to reduce the cost of the grinding device 20.

Moreover, in respective embodiments, although the case has been explained, where the grinding device 20 is provided with the correction tool R and the correction tool holding device 40 for holding the correction tool R, it is not necessarily limited to this, and the grinding device may be designed without providing the correction tool R and the correction tool holding device 40 for holding the correction tool R.

The invention claimed is:

1. A neck portion grinding apparatus comprising:
   a grinding device having a disc-like grinding wheel and a wheel rotating device for rotating the grinding wheel; and
   a machine tool having a main shaft for rotatably supporting a rotating tool and a table for mounting the grinding device or a workpiece to be processed by the rotating tool thereon, and relatively moving the main shaft and the table by numeral control,
   wherein the grinding device is adapted to be detachable with respect to the machine tool,
   wherein a shape of a neck portion of the rotating tool can be changed by relatively moving the main shaft and the table in a manner to approach with one another while mutually rotating the rotating tool and the grinding wheel, and grinding the rotating tool by the grinding wheel, and
   wherein the workpiece is processed by the rotating tool when the workpiece is mounted on the table and the main shaft is moved in a direction to approach to the table.

2. The neck portion grinding apparatus according to claim 1, wherein:
   the grinding device is provided with a correction tool adapted to be capable of grinding the grinding wheel, and a correction tool holding device for holding the correction tool in such a manner that the correction tool can approach to or separate from the grinding wheel; and
   the grinding wheel is corrected by the correction tool by abutting the correction tool on the grinding wheel by movements of the correction tool holding device while rotating the grinding wheel by the wheel rotating device.

3. The neck portion grinding apparatus according to claim 2, wherein:
   the correction tool holding device is provided with a swinging device for swinging the correction tool relative to the grinding wheel; and
   an outer peripheral portion of the grinding wheel serving as an active face is corrected to a circular arc cross section by the correction tool by abutting the correction tool on the grinding wheel by movements of the correction tool holding device and also swinging motions of the correction tool while rotating the grinding wheel by the wheel rotating device.

4. The neck portion grinding apparatus according to claim 1, wherein:
   the grinding wheel is provided with a rounded section positioned around an outer peripheral portion serving as an active face and formed into a circular arc cross section; and
   the rotating tool is ground by a portion of the grinding wheel including at least the rounded section.

5. The neck portion grinding apparatus according to claim 1, wherein:
   the grinding wheel of the grinding device is provided with a rounded section positioned around an outer peripheral portion serving as an active face where the active face is made of diamond abrasive grains.

* * * * *